United States Patent
Zhao

(10) Patent No.: US 10,419,596 B2
(45) Date of Patent: Sep. 17, 2019

(54) INFORMATION PROCESSING APPARATUS TERMINAL, DEVICE AND METHOD FOR ADJUSTING OPERATING MODES OF TERMINAL

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/694,021

(22) Filed: Sep. 1, 2017

(65) Prior Publication Data

US 2018/0191891 A1 Jul. 5, 2018

(30) Foreign Application Priority Data

Jan. 3, 2017 (CN) .......................... 2017 1 0001286

(51) Int. Cl.
*H04M 1/725* (2006.01)
*H04W 4/02* (2018.01)

(52) U.S. Cl.
CPC ... *H04M 1/72569* (2013.01); *H04M 1/72572* (2013.01); *H04M 1/72577* (2013.01); *H04W 4/023* (2013.01); *H04W 4/027* (2013.01); *H04M 2250/10* (2013.01); *H04M 2250/12* (2013.01)

(58) Field of Classification Search
CPC ......... H04M 1/72569; H04M 1/72572; H04W 4/027; H04W 4/025
USPC .................................................... 455/456.1
See application file for complete search history.

(56) References Cited

U.S. PATENT DOCUMENTS

| | | | | |
|---|---|---|---|---|
| 2015/0119728 | A1* | 4/2015 | Blackadar | A61B 5/7264 600/484 |
| 2016/0179197 | A1 | 6/2016 | Qian et al. | |
| 2017/0214540 | A1 | 7/2017 | Wang et al. | |
| 2017/0361162 | A1* | 12/2017 | Bailly | G06F 13/385 |
| 2018/0168273 | A1* | 6/2018 | Case, Jr. | A43B 1/0036 |

FOREIGN PATENT DOCUMENTS

| | | |
|---|---|---|
| CN | 103533171 A | 1/2014 |
| CN | 103870220 A | 6/2014 |
| CN | 105100527 A | 11/2015 |
| CN | 105446578 A | 3/2016 |
| CN | 105511609 A | 4/2016 |

OTHER PUBLICATIONS

First Chinese Office Action dated Feb. 3, 2019.

* cited by examiner

*Primary Examiner* — Inder P Mehra
(74) *Attorney, Agent, or Firm* — Dilworth & Barrese, LLP.; Michael J. Musella, Esq.

(57) ABSTRACT

A terminal, which includes: an operation mode adjusting unit configured to receive an operation mode adjustment instruction generated at least based on the current physiological characteristic data of the terminal's user, and set the terminal's operation mode according to the operation mode adjustment instruction. More intelligent terminal operation mode switching is achieved in the terminal through setting the operation mode of terminal by operation mode adjusting instruction generated at least based on the current physiological characteristic data of the terminal's user, thereby, user experience is improved. An information processing apparatus, a device and method for adjusting operating modes of the terminal are further provided.

13 Claims, 9 Drawing Sheets

INFORMATION PROCESSING APPARATUS TERMINAL, DEVICE AND METHOD FOR ADJUSTING OPERATING MODES OF TERMINAL

TECHNICAL FIELD

Embodiments of the present disclosure relate to an information processing apparatus, a terminal, a device and method for adjusting operating modes of the terminal.

BACKGROUND

With the progressive development of terminal technology, users wish terminals can adjust operating mode autonomously according to the active state the user is in. A terminal operating mode adjustment method can only remind the user to switch the terminal's operating mode according to the terminal's speed data. However, when the terminal's speeds are the same, the user may be in different active states; while when the terminal's speeds are different, the user may be in the same active state.

For example, the traveling speeds for a passenger and a driver in a traveling car are identical. If a wearable device of the driver or the carried cell phone detects the driver's traveling speed, it is actually impossible to determine whether he is in a driving state or a riding state. Further, when a user is riding or driving a car, the user's speed may change frequently in the range of 0-90 km/hr. Therefore, it is not accurate enough to only remind the user to adjust the terminal's operating mode according to the terminal's speed. Therefore, it is highly desired to have a more accurate terminal and/or a device, device or method that can adjust the terminal's operating mode more intellectually.

SUMMARY

According to an embodiment of this disclosure, an information processing apparatus is provided, comprising: a data receiving unit, a database unit and a processing unit, the data receiving unit being configured to receive current physiological characteristic data of the user and provide it to the processing unit; the database unit storing computer program instructions causing the processor to executing following steps when processing the computer program instructions: determining the user's active state at least based on the current physiological characteristic data received by the data receiving unit and using the active state as the user's current active state; wherein the current active state is used to generate an operation mode adjustment instruction for the terminal.

For example, the processing unit further executes following steps when processing the computer program instructions: sending the current active state to the terminal to allow the terminal to generate the operation mode adjustment instruction according to the current active state, or generate the operation mode adjustment instruction corresponding to the current active state and sending it to the terminal; wherein the operation mode adjustment instruction is used to indicate the terminal to adjust a current operation mode.

For example, further comprising a speed acquiring unit, wherein the speed acquiring unit is configure to acquire a current moving speed of the user; the processing unit further executes following steps when processing the computer program instructions: determining the user's the active state based on the current physiological characteristic data and the current moving speed, and using the active state as the user's current active state; the processing unit further executes following steps when processing the computer program instructions: determining the user's current possible active state based on the current physiological characteristic data, then determining the user's active state based on the current possible active state and the current moving speed, and using the active state as the current active state.

For example, further comprising a speed acquiring unit, wherein the speed acquiring unit is configure to acquire a current moving speed of the user; the processing unit further executes following steps when processing the computer program instructions: determining the user's the active state based on the current physiological characteristic data and the current moving speed, and using the active state as the user's current active state; the processing unit further executes following steps when processing the computer program instructions: determining the user's first set of current possible active states based on the current moving speed, then determining the user's the active state based on the first set of current possible active states and the current physiological characteristic data, and using the active state as the current active state.

For example, further comprising a speed acquiring unit, wherein the speed acquiring unit is configure to acquire a current moving speed of the user; the processing unit further executes following steps when processing the computer program instructions: determining the user's the active state based on the current physiological characteristic data and the current moving speed in combination, and using the active state as the user's the current active state.

For example, further comprising a physiological characteristic detecting unit and a speed detecting unit, wherein the physiological characteristic detecting unit is configured to detect and output the current physiological characteristic data, and the data receiving unit is configured to receive the current physiological characteristic data from the physiological characteristic detecting unit; wherein, the speed detecting unit is configured to detect and output the current moving speed, and the speed acquiring unit is configured to acquire the current moving speed from the speed detecting unit.

According to an embodiment of this disclosure, a terminal is provided, comprising: an operation mode adjusting unit configured to receive an operation mode adjustment instruction generated at least based on the current physiological characteristic data of the terminal's user, and set the terminal's operation mode according to the operation mode adjustment instruction.

For example, further comprising a speed detecting unit, wherein the speed detecting unit is configured to detect and output the user's current moving speed.

For example, further comprising: a signal receiving device configured to receive the user's current active state determined based on the current moving speed data and the current physiological characteristic data of the terminal's user; a processing unit configured to generate the operation mode adjustment instruction based on the current active state and send the operation mode adjustment instruction to the operation mode adjusting unit.

For example, further comprising: a signal receiving device configured to at least receive the current physiological characteristic data; a processing unit configured to determine the user's current active state based on the user's current moving speed and the current physiological characteristic data, and generate the operation mode adjustment instruction based on the current active state and send the operation mode adjustment instruction to the operation mode adjusting unit.

According to an embodiment of this disclosure, a terminal is provided, comprising: a physiological characteristic detecting unit configured to detect the current physiological characteristic data of the user of the terminal; a speed detecting unit configured to detect the user's current moving speed; a data output unit configured to output detected the user's current physiological characteristic data and the user's current moving speed, or configured to output data obtained based on the user's current physiological characteristic data and the user's current moving speed, wherein the user's current physiological characteristic data and the user's current moving speed are used to generate an operation mode adjustment instruction for the second terminal.

For example, further comprising: a processing unit configured to acquire the current moving speed and the current physiological characteristic data from the data output unit and determine the user's current active state based on the current moving speed and the current physiological characteristic data.

For example, wherein the processing unit further generates the operation mode adjustment instruction based on the current active state.

According to an embodiment of this disclosure, a device for adjusting an operation mode of the terminal is provided, comprising: a speed detecting device configured to detect a current moving speed of the terminal's user; a physiological characteristic detecting device configured to detect the current physiological characteristic data of the user; a controlling device configured to determine the user's current active state at least according to the user's current moving speed and the current physiological characteristic data, thereby generating an operation mode adjustment instruction for the terminal; and an operation mode switching device configured to adjust the terminal's operation mode according to the operation mode adjustment instruction.

According to an embodiment of this disclosure, a method for adjusting an operation mode of the terminal is provided, comprising: detecting a current moving speed of the terminal's user; detecting the user's current physiological characteristic data; determining the user's current active state at least according to the user's current moving speed and the current physiological characteristic data, thereby generating an operation mode adjustment instruction for the terminal; and adjusting the operation mode of the terminal according to the operation mode adjustment instruction.

According to an embodiment of this disclosure, an information processing method for the information processing apparatus is provided, comprising: receiving the user's current physiological characteristic data; and determining the user's current active state at least based on the received current physiological characteristic data, wherein the current active state is used to generate an operation mode adjustment instruction for the terminal.

According to an embodiment of this disclosure, a method for adjusting an operation mode of the terminal is provided, comprising: receiving an operation mode adjustment instruction generated at least based on the current physiological characteristic data of the terminal's user; and setting the operation mode of the terminal according to the operation mode adjustment instruction.

According to an embodiment of this disclosure, a method for adjusting an operation mode of the terminal is provided, comprising: detecting the current physiological characteristic data of the terminal's user; detecting a current moving speed of the user; outputting the detected the user's current physiological characteristic data and the user's current moving speed, or outputting data obtained based on the user's current physiological characteristic data and the user's current moving speed, wherein the user's current physiological characteristic data and the user's current moving speed are used to generate an operation mode adjustment instruction for the second terminal.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
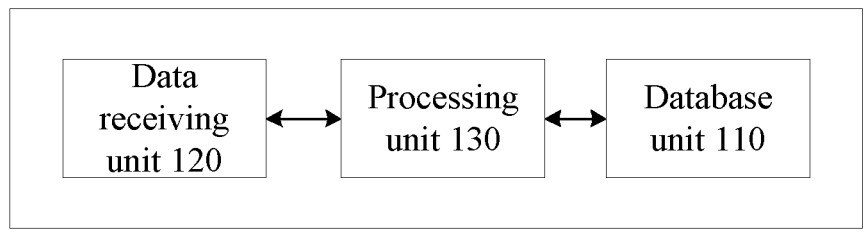
FIG. 1 is an illustrative block diagram of an information processing apparatus provided in one embodiment of the present disclosure.

Hereinbelow, the technical solutions of the embodiments will be described in a clearly and fully understandable way in connection with the drawings. The example embodiments of this disclosure and their multiple features and beneficial details will be stated more completely referred the non-limiting example embodiments shown in the figures and fully described in the following description. It should be noted that, the features in the figures are not necessary to be drawn to scale. In this disclosure, the description about known materials, components and technology is omitted so as to avoid the example embodiments of this disclosure being not clear. The examples given are only for benefiting to understand the achieving of the example embodiments of this disclosure, and furthermore make the skilled in the art to achieve the example embodiments. Thus, these examples should not be regarded as a limitation of the scope of the embodiments of this disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Additionally, in each embodiment of this disclosure, same or similar reference signs represent same or similar components.

Embodiments of the present disclosure provide an information processing apparatus, an information processing method, a terminal and a device and method for adjusting operation mode of a terminal that realize more intelligent switching of the terminal's operation modes, improve the accuracy of the terminal's operation mode switching and in turn improve the use experience of the user.

At least one embodiment of the present disclosure provides an information processing apparatus including a data receiving unit and a processing unit. The data receiving unit is configured to receive the current physiological characteristic data of the user and provide it to the processing unit. The processing unit is configured to determine the user's active state at least based on the current physiological characteristic data received by the data receiving unit and use the active state as the user's current active state. The user's current active state is used to generate the operation mode adjusting instruction for the terminal.

For example, the processing unit may be further configured to send the current active state to the terminal such that the terminal generates the operation mode adjustment instruction according to the current active state or generates an operation mode adjustment instruction corresponding to the current active state and sends it to the terminal. The operation mode adjustment instruction is used to instruct the terminal to adjust its current operation mode.

For example, the method for determining the user's active state may be set according to the demands of practical applications and embodiments of the present application does not impose any limitation to this. For example, the information processing apparatus may further include a database unit for storing different active states and physiological characteristic data of the terminal's user under different active states, the processing unit may be configured to inquire the database unit based on the current physiological characteristic data received by the data receiving unit to determine the user's active state and use said user's active state as the user's current active state.

For example, FIG. 1 is an illustrative block diagram of an information processing apparatus 100 provided in one embodiment of the present disclosure. The information processing apparatus 100 may be used to adjust the terminal's operation mode.

As shown in FIG. 1, the information processing apparatus 100 may include a database unit 110, a data receiving unit 120 and a processing unit 130.

In the embodiment, the information processing apparatus 100 may be specifically implemented in forms such as a server, a terminal etc., and while implemented as a server, it may be a general purpose server or a dedicated server, a virtual server or a cloud server etc. For example, the terminal may be a handheld equipment such as a cell phone or a wearable equipment such as a hand ring.

The user's active states in the present disclosure may include active states under different communication modes (different communication modes for short). The active states under different communication modes described in the present disclosure may include: walking, running, biking, driving (namely driving state), riding, sitting, and standing (namely standing still) etc.

For example, the database unit 110 may be for example a memory that may store computer program instructions which can be executed by the processing unit 130, and also may store different active states namely active state parameters under different communication modes and physiological characteristic data of the user under these different active states. The physiological characteristic data may be the user's historic active state data or set empirical values. If the physiological characteristic data is the user's historic active state data, it may be historic data within a set time interval from the current instant and may be updated on scheduled time.

For example, the physiological characteristic data may be stored in the memory that may include volatile memory and/or non-volatile memory. For example, it may include various types of memory devices or storage medium such as a read only memory (ROM), a hard disk, a flash memory. The database unit 110 may work via a dedicated processing unit or a general purpose processing unit such as the processing unit 130.

For example, the type of the physiological characteristic data stored in the database unit 110 may be set according to practical applications which are not limited in embodiments of the present application. For example, the physiological characteristic data may include one of or a combination of pulse, temperature, heart rate, breath, EEG (Electroencephalogram), ECG (Electrocardio), blood pressure, blood oxygen, EMG, skin impedance, skin heat value.

For example, the different active states and the physiological characteristic data of the terminal's user under different active states stored in the database unit 110 may be acquired with different modes according to practical situations which is not limited in embodiments of the present application.

If the physiological characteristic data is the user's historic active state data, the physiological characteristic data may be obtained before the user starts the above-mentioned information processing apparatus 100. For example, the user may participate a test of physiological characteristic data under a series of communication modes (namely the user is in different active states) while wearing respective sensors. For example, the user may walk for 40 minutes, run for 30 minutes, ride a bike for 60 minutes, drive for 120 minutes, ride for 180 minutes, sit for 60 minutes and stand for 60 minutes etc. After completing a test, the user may rest for a period such as 60 minutes and then participates next test to avoid disturbance on the next test by the previous test, thereby ensuring accuracy of the physiological characteristic data obtained by test. When the user is participating the above-mentioned test, sensors worn by the user detect and record the user's physiological characteristic data once according to a certain time period such as 1 minute.

For example, the physiological characteristic data may also be continuously acquired and refined during daily life of the terminal's user while using the information processing apparatus 100. For example, the user may set the worn sensor to a physiological characteristic data acquisition mode at an early stage after starting one communication mode, and set the frequency with which the physiological characteristic data is acquired such as acquiring once per minute, and then input the type of the communication mode after the communication mode is finished. As another example, the user may set the worn sensor to the physiological characteristic data acquisition mode permanently, and complement, update, and input starting and stopping times for different communication modes regularly.

For example, the database unit 110 may store physiological characteristic data in a form that may be selected according to practical situations. For example, the database unit may adopt relational database or non-relational database to which query and update operations may be done by for example SQL (Structured Query Language) or similar operating command sets. Embodiments of the present application do not impose any specific limitation to this. For example, the database unit 110 may store raw data of the user's physiological characteristics. For example, raw data of body temperature detected by the sensor under different active states may be stored directly in the database unit 110. As another example, the database unit 110 may also store characteristic parameters extracted from the user's raw physiological characteristic data. For example, for pulse data under different active states detected by the sensor, a smooth pulse waveform may be obtained after preprocessing such as de-noising, baseline adjustment, then two characteristic points, namely start and stop points and peak point of the pulse wave may be extracted in time domain, and it is possible in turn to calculate the pulse cycle and the principal wave peak height. The obtained pulse cycle and the principal wave peak height may form a feature vector and be stored in the database unit 110.

For example, the data receiving unit 120 (such as antenna, data transceiver) may receive the user's current physiological characteristic data. For example, the data receiving unit 120 may acquire the user's current physiological characteristic data from outside the information processing apparatus 100 (for example, a server storing these physiological characteristic data or another terminal acquiring these physiological characteristic data) via the communication unit. For example, the communication unit may acquire the user's current physiological characteristic data from other devices (for example hand ring, terminal, intellectual watch, intellectual glasses, intellectual shoes, intellectual clothings, slab computer, personal computer, server, mobile station, base station etc.) via network or other technology, in which said network may be Internet, wireless local area network, mobile communication network etc., and said other technology may include for example Bluetooth communication, infrared communication etc. As another example, the data receiving unit 120 may also acquire the user's current physiological characteristic data from inside the information processing apparatus 100 via for example a physical line, and then the device itself stores these data or acquires these data. The data receiving unit 120 may be implemented by one or combination of software, hardware and firmware and other embodiments are similar to that.

For example, the data receiving unit 120 may receive the user's current physiological characteristic data according to a first time period. For example, the first time period may be set by the user in advance (for example, 30 minutes). As another example, the first time period may also be adjusted intellectually according to the instruction sent by the processing unit 130. For example, the first time period may be shortened to 5 minutes when the processing unit 130 sends a receiving frequency increasing instruction.

For example, the processing unit 130 may be a processor that may process the computer program instructions in the memory and execute the following steps while processing said computer program instructions.

It is possible to inquire the database unit 110 based on the current physiological characteristic data received by the data receiving unit 120 to determine the user's active state and use said user's active state as the user's current active state. For example, the current active state may be output via the communication device and passed to other external devices. For example, the current active state may also be passed to other units inside the information processing apparatus or other external devices electrically connected with the information processing apparatus via internal physical lines.

For example, the processing unit 130 may compare the current physiological characteristic data (such as heart rate data, electromyographic signal data) received by the data receiving unit 120 against the physiological characteristic data (such as heart rate data, electromyographic signal data) under different active states stored in the database and may obtain the current active state. For example, the current active state may be of one or more types. For example, in case only the information that the user's heart rate is 130 counts/minute is available, the user's current active state (namely communication mode) may be running or cycling. For example, in case that the user's heart rate data and the electromyographic signal data (for example, electromyographic signal at the lower leg has an intensity stronger than that of at the upper leg) are available, it is further possible to determine that the user's current active state is running.

For example, the current active state may be used to generate the operation mode adjusting instruction for the terminal. For example, the current active state information or/and the operation mode adjustment instruction obtained by the processing unit 130 may be passed to the terminal via the communication unit and used for intellectual adjustment of the terminal's operation mode. For example, the communication unit may be as described in the embodiment shown in FIG. 1, and will not be described any more here.

For example, the processing unit 130 is for example a central processing unit (CPU) or other type of processing unit that has the data processing capability and/or the instruction execution capability, and may be implemented with X86 architecture or ARM architecture. For example, the processing unit 130 may be a general purpose processor, and may also be a monolithic computer, a microprocessor, a digital signal processor, a dedicated image processing chip or a field programmable logic array etc. The processing units in the undermentioned embodiments are similar.

Figure 2:
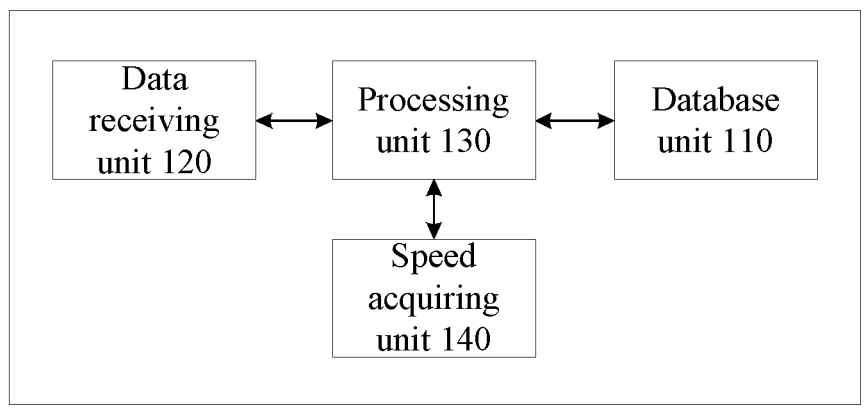
FIG. 2 is another illustrative block diagram of an information processing apparatus provided in one embodiment of the present disclosure.

For example, FIG. 2 is another illustrative block diagram of an information processing apparatus 100 provided in one embodiment of the present disclosure. As compared to the information processing apparatus 100 shown in FIG. 1, the information processing apparatus 100 may further include a velocity acquiring unit 140. In the present embodiment, the device 100 may also be embodied as various forms such as a server, a terminal.

For example, the speed acquiring unit 140 may acquire the user's current moving speed. For example, the speed acquiring unit 140 may acquire the user's current moving speed from outside the information processing apparatus 100 (for example, a server storing the moving speed data or another terminal acquiring the moving speed data). As another example, the speed acquiring unit 140 may further acquire the user's current moving speed from inside the information processing apparatus 100 via physical lines.

For example, the speed acquiring unit 140 may acquire the user's current moving speed according to the second time period. The second time period may be set according to practical situations which are not limited by embodiments of the present application. For example, the second and the first time period may be identical or different. For example, the second time period may be set by the user in advance (for example, 30 minutes). As another example, the second time period may also be adjusted intellectually according to the instruction sent by the processing unit 130. For example, in case that the user's psychological characteristics data changes suddenly (for example, heart rate rising from 70 counts/minute to 110 counts/minute), the processing unit 130 may issue a receiving frequency increasing instruction and the second time period may be shortened to 5 minutes. Accordingly, the first time period may also be adjusted accordingly in case that the user's current moving speed changes suddenly. The speed acquiring unit 140 may be implemented by one or combination of software, hardware and firmware and other embodiments are similar to that.

For example, the processing unit 130 may determine the user's active state based on the current physiological characteristic data and the current moving speed and use the active state as the user's current active state.

For example, the processing unit 130 may select how to determine the user's current active state based on the user's current physiological characteristic data and the current moving speed according to practical situations, which is not limited by embodiments of the present application.

For example, the processing unit 130 may determine the user's current possible active state based on the current physiological characteristic data, then determine the user's active state based on the current possible active state and the current moving speed, and use said active state as the user's current active state. For example, in case that the user's heart rate is 130 counts/minute, the current possible active state may be running or cycling (or the user's heart rate being 130 counts/minute). It is then possible to determine the user's current active state according to the user's current moving speed data. For example, when the current moving speed is 9~15 km/h, the user's current active state may be running. While in case that the current moving speed is 20~25 km/hr, the user's current active state may be cycling.

As another example, the processing unit 130 may determine the user's first set of current possible active states based on the current moving speed, and then inquire the database unit 110 to determine the user's current active state based on the first set of current possible active state and the current physiological characteristic data. For example, in case that the current moving speed is 30 km/hr, the user's first set of current possible active states may be cycling and driving. Then it is possible to determine that the user's current active state may be cycling according to the user's heart rate data of 130 counts/minute.

As another example, the processing unit 130 may inquire the database unit 110 to determine the user's current possible active state based on the current physiological characteristic data. In the meanwhile, the processing unit 130 may determine the user's first set of current possible active state based on the current moving speed. Then it is possible to determine the user's current active state based on the user's current possible active state and the user's first set of current possible active state. For example, in case that the user's heart rate is 130 counts/minute, the user's current possible active state may be running or cycling. In case that the current moving speed is 30 km/h, the user's first set of current possible active states may be cycling and driving. It is possible to determine that the user's current active state may be cycling according to the user's current possible active state and the user's first set of current possible active state.

As another example, the processing unit 130 may further determine the user's current active state based on the current physiological characteristic data in connection with the current moving speed. For example, in case that the user's heart rate is 150 counts/minute, the user's current possible active state may be running or cycling. In case that the current moving speed is 12 km/hr, the user's first set of current possible active states are also cycling or driving. It is now difficult to determine the user's current active state ultimately. However, in case of comprehensive considering the user's heart rate and the current moving speed, it is possible to determine that the user's current active state may be running.

For example, one or more of the current possible active state information, the first set of current possible active state, the current active state and the operation mode adjustment instruction obtained by the processing unit 130 may be passed to the terminal via the communication unit and used for intellectual adjustment of the terminal's operation mode.

Figure 3:
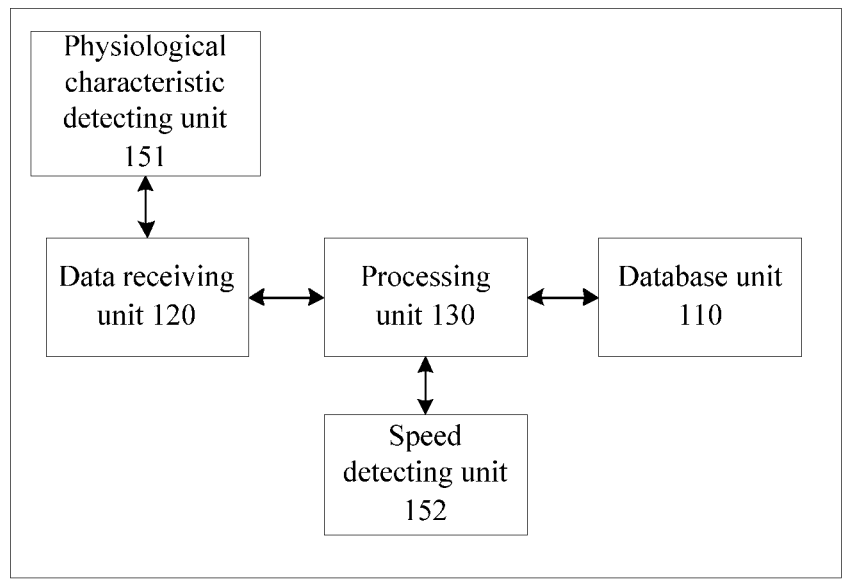
FIG. 3 is yet another illustrative block diagram of an information processing apparatus provided in one embodiment of the present disclosure.

For example, FIG. 3 is yet another illustrative block diagram of an information processing apparatus 100 provided in one embodiment of the present disclosure. As shown in FIG. 3, as compared with the information processing apparatus 100 shown in FIG. 1, the information processing apparatus 100 may further include a physiological characteristic detecting unit 151 and/or a speed detecting unit 152. In the present embodiment, the device 100 may also be embodied as various forms such as a terminal.

For example, the physiological characteristic detecting unit 151 may detect and output the user's current physiological characteristic data, the data receiving unit 120 may receive the user's current physiological characteristic data from the physiological characteristic detecting unit 151 via physical lines between it and the physiological characteristic detecting unit 151. The current physiological characteristic data detected by the physiological characteristic detecting unit 151 and the form of the physiological characteristic detecting unit 151 may be set according to practical application requirements, which is not specifically limited in embodiments of the present application. For example, the physiological characteristic detecting unit 151 may detect one or combination of the user's pulse, body temperature, heart rate, breath, EEG, ECG, blood pressure, blood oxygen, EMG, skin impedance data. For example, the physiological characteristic detecting unit 151 may include one or more types of sensors that may be semiconductor devices. As another example, the physiological characteristic detecting unit 151 may also be one or more types of wearable intelligent terminals configured with sensors, which may be an intelligent hand ring, an intelligent watch, intelligent shoes, intelligent clothing, intelligent glasses or an intelligent hat. For example, the wearable intelligent terminal technology may be referred to for the method for integrating sensors in the wearable intelligent terminal, which is not limited in embodiments of the present application. For example, it is possible to combine sensors, processor and communication module together by texture technology with fibers and threads and form intelligent clothing that can detect user's current physiological characteristic data.

For example, the speed detecting unit 152 may detect and output the user's current moving speed. The method with which the speed detecting unit 152 detects the user's current moving speed may be selected according to practical application requirements, which is not limited in embodiments of the present application. For example, the speed detecting unit 152 may acquire the current moving speed according to one or more of the satellite positioning system (e.g., GPS, BeiDou system etc.) data, communication base station data and speed sensor data. For example, it is possible to acquire the user's position information from the communication base station or the satellite positioning data, and then calculate the user's current moving speed according to the distance of the user's position variation and the time for which the user's position changes. As another example, it is also possible to acquire the user's current moving speed data through the speed sensor data, in which the speed sensor may be a linear speed sensor and/or an acceleration sensor.

Figure 4:
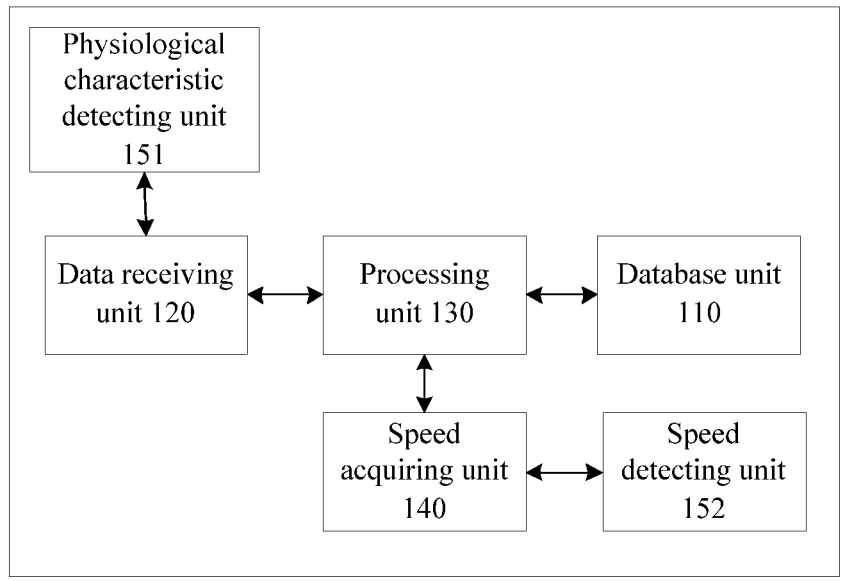
FIG. 4 is yet another illustrative block diagram of an information processing apparatus provided in one embodiment of the present disclosure.

For example, the processing unit 130 may acquire the current moving speed output by the speed detecting unit 152 via physical lines between the speed detecting unit 152 and the processing unit 130. As another example, as shown in FIG. 4, the information processing apparatus 100 further includes a speed acquiring unit 140 that may further acquire the user's current moving speed from the speed detecting unit 152. The processing unit 130 may in turn acquire the current moving speed via physical lines between the speed acquiring unit 140 and the processing unit 130.

At least one embodiment of the present disclosure provides a terminal including an operation mode adjusting unit configured to receive the operation mode adjustment instruction generated at least based on the terminal user's current physiological characteristic data and set the terminal's operation mode according to the operation mode adjustment instruction.

Figure 5:
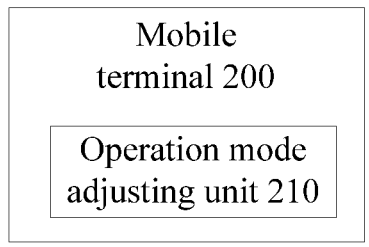
FIG. 5 is an illustrative block diagram of a terminal provided in another embodiment of the present disclosure.

For example, FIG. 5 is an illustrative block diagram of a terminal 200 provided in another embodiment of the present disclosure. As shown in FIG. 5, The terminal 200 includes an operation mode adjusting unit 210 configured to receive the operation mode adjustment instruction generated at least based on the terminal 200's user's current physiological characteristic data (e.g., current moving speed data and current physiological characteristic data) and set the terminal's operation mode according to the operation mode adjustment instruction. The terminal 200 may be specifically embodied in various forms such as a mobile telephone (cell phone), a music player, a watch, a navigating device, intelligent glasses etc., therefore in addition to the operation mode adjusting unit 210, it may further include components such as a memory, a communication device, a speaker, a display screen or an input device (such as keys, touch screen etc.).

For example, the operation mode adjusting unit 210 may acquire the operation mode adjusting instruction from outside the terminal 200 (e.g., a server or another terminal) via a communication unit. Here, the terminal 200 does not need to set the speed detecting unit and the physiological characteristic detecting unit, thereby reducing the volume, weight, power consumption and cost of the terminal 200. As another example, the operation mode adjusting unit 210 may acquire the operation mode adjustment instruction from inside the terminal 200 via physical lines. Here, it is possible to reduce the power consumption and data traffic expense caused by data transfer. For example, the operation mode adjusting unit 210 may receive the operation mode adjustment instruction according to a time period. For example, the time period may be set by the user in advance (for example, 30 minutes). The operation mode adjusting unit 210 may be implemented by one or combination of software, hardware and firmware and other embodiments are similar to that.

For example, the operation mode adjustment instruction may be adjusting the operation mode of the terminal 200 to a running mode. As another example, the operation mode adjustment instruction may also be adjusting the operation mode of the terminal 200 to a driving mode. For example, the user may set the type of the operation mode and cell phone parameters and/or application software priorities under different operation modes in advance. For example, under the running mode, the shortcut icon of the music software may be placed on the main interface of the terminal 200 and the message prompting of the terminal 200 may be set in the form of vibration plus ringing. As another example, under the driving mode, the shortcut icon of the navigating software may be placed on the main interface of the terminal 200 and the message prompting of the terminal 200 may be set in the form of voice playing.

Figure 6:
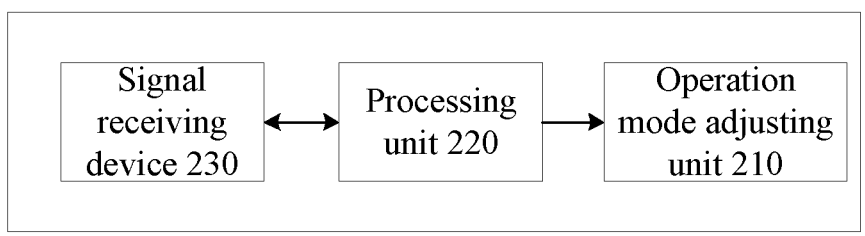
FIG. 6 is another illustrative block diagram of a terminal provided in another embodiment of the present disclosure.

For example, FIG. 6 is another illustrative block diagram of a terminal 200 provided in another embodiment of the present disclosure. As compared with the terminal 200 shown in FIG. 5, the terminal 200 shown in FIG. 6 further includes a signal receiving device 230 and a processing unit 220.

For example, the signal receiving device 230 may be configured to receive the current active state of the user of terminal 200 determined from the current moving speed data and the current physiological characteristic data. For example, the signal receiving device 230 may acquire the user's current active state from outside the terminal 200 (e.g., a server or another terminal) via the communication unit in wired or wireless manner. As another example, the signal receiving device 230 may also acquire the user's current active state from inside the terminal 200 via physical lines. For example, the communication unit may be as described in the embodiment of the information processing apparatus, and will not be described any more here.

For example, the processing unit 220 may be configured to generate the operation mode adjustment instruction based on the user's current active state and send it to the operation mode adjusting unit 210. For example, in case that the signal receiving device 230 receives the user's current active state being driving, the processing unit 220 may generate an operation mode adjustment instruction for switching the terminal's 200 operation mode to driving mode, which may be passed to the operation mode adjusting unit 210 via physical lines between the processing unit 220 and the operation mode adjusting unit 210, and then the operation mode adjusting unit 210 may set the terminal's operation mode according to the operation mode adjustment instruction.

Figure 7:
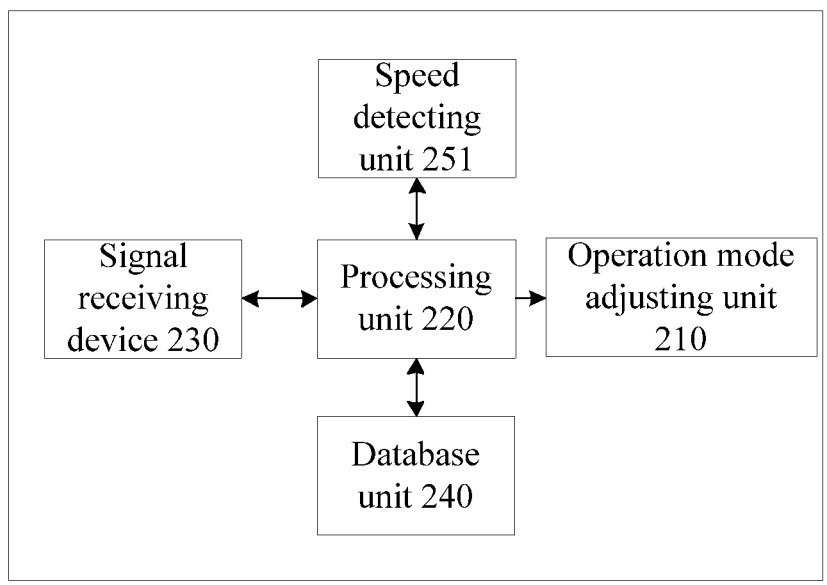
FIG. 7 is yet another illustrative block diagram of a terminal provided in another embodiment of the present disclosure.

For example, FIG. 7 is yet another illustrative block diagram of a terminal 200 provided in another embodiment of the present disclosure. As compared with the terminal 200 shown in FIG. 5, the terminal 200 shown in FIG. 7 may further include a speed detecting unit 251, a signal receiving device 230, a database unit 240 and a processing unit 220.

For example, the speed detecting unit 251 may be configured to detect and output the user's current moving speed. For example, the speed detecting unit 251 may be configured to acquire the current moving speed according to one or more of the satellite positioning system data, communication base station data and speed sensor data. For example, the speed detecting unit 251 may pass the current moving speed to the processing unit 220 via physical lines between it and the processing unit 220. For example, the speed detecting unit 251 may detect the user's current moving speed according to a time period. The description in embodiments of the information processing apparatus may be referred to for the method for setting the time period, which will not be described any more herein.

For example, the signal receiving device 230 may be configured to receive the current physiological characteristic data based on the user of the terminal 200. For example, the signal receiving device 230 may acquire the user's current physiological characteristic data from outside the terminal 200 (e.g., a server or another terminal) via the communication unit. For example, the signal receiving device 230 may receive the user's current physiological characteristic data according to a time period. It is possible to refer to the description of the first time period and the second time period in embodiments of the information processing apparatus for the method for setting the time period, which will not be described any more herein. Obviously, the signal receiving device 230 may further receive the user's current moving speed. Now, the terminal 200 needs not to set the speed detecting unit 251.

For example, the database unit 240 may store different active states and the physiological characteristic data under different active states of the user of terminal 200. For example, the database unit 240 may be as described in the embodiment of the information processing apparatus, and will not be described any more here.

For example, the processing unit 220 may be configured to determine the user's current active state based on the user's current moving speed and the user's current physiological characteristic data (for example, it is possible to determine the user's current active state by inquiring the database unit 240). For example, description in embodiments of the information processing apparatus may be referred to for the method with which the processing unit 220 determines the current active state, which will not be described any more herein.

For example, the processing unit 220 may generate the operation mode adjustment instruction based on the user's current active state and send it to the operation mode adjusting unit 210. For example, description in the embodiment shown in FIG. 6 may be referred to for the content relating to that the processing unit 220 generates an operation mode adjustment instruction and sends it to the operation mode adjusting unit 210, which will not be described any more herein.

Figure 8:
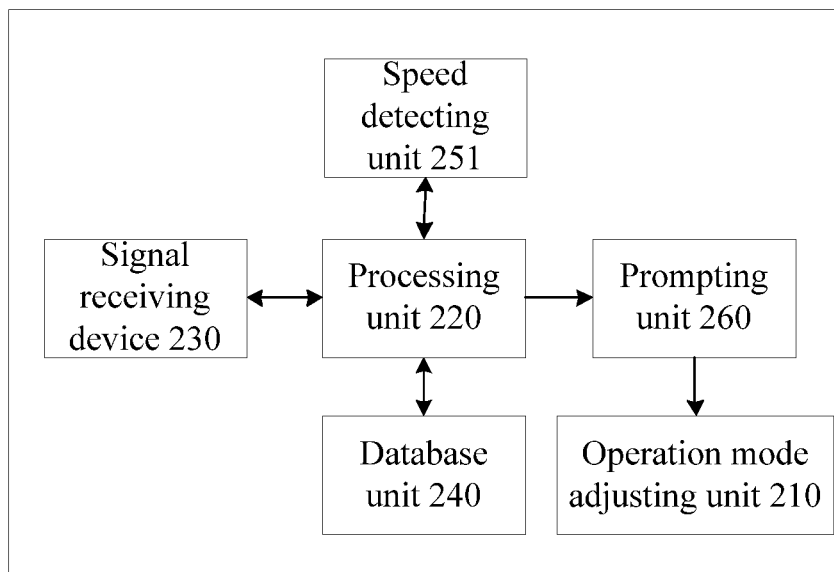
FIG. 8 is yet another illustrative block diagram of a terminal provided in another embodiment of the present disclosure.

For example, FIG. 8 is yet another illustrative block diagram of a terminal 200 provided in another embodiment of the present disclosure. As compared with the terminal 200 shown in FIG. 7, the terminal 200 shown in FIG. 8 further includes a prompting unit 260. The prompting unit 260 may be configured to prompt the user to select an operation mode or select whether or not to adjust the operation mode, and then control the operation mode adjusting unit 210 according to the user's input before the operation mode adjustment instruction is sent to the operation mode adjusting unit 210.

For example, when there is more than one current active states determined (such as running and cycling), the prompting unit 260 may prompt the user to select one of the operation modes corresponding to the determined plurality of current active states as the operation mode of the terminal 200 (for example, please select one of the running mode and the cycling mode: running mode or cycling mode), and the prompting unit 260 may further prompt the user whether or not to set the operation mode of the terminal 200 to the operation mode corresponding to the current active state with maximum probability (for example, the terminal is about to switch the operation mode to running mode in 1 minute: allow switching or reject switching).

For example, the form in which the prompting unit prompts the user to switch operation modes may be set according to practical application requirements, which is not limited in embodiments of the present application. For example, the prompting unit may prompt the user to select an operation mode by displaying a dialog box on the terminal 200. As another example, the prompting unit may further prompt the user to select an operation mode by playing voice.

Accordingly, the terminal 200 shown in FIG. 6 may also be configured with a prompting module (not shown in FIG. 6) to thereby avoid setting the terminal 200 to a wrong operation mode.

At least one embodiments of the present disclosure provide a terminal including a physiological characteristic detecting unit, a speed detecting unit and a data output unit. The physiological characteristic detecting unit is configured to detect the current physiological characteristic data of the user of the terminal; the speed detecting unit is configured to detect the user's current moving speed; and the data output unit is configured to output the detected user's current physiological characteristic data and the user's current moving speed, or is configured to output data obtained based the user's current physiological characteristic data and the user's current moving speed. The user's current physiological characteristic data and the user's current moving speed are used to generate an operation mode adjustment instruction for the second terminal.

Figure 9:
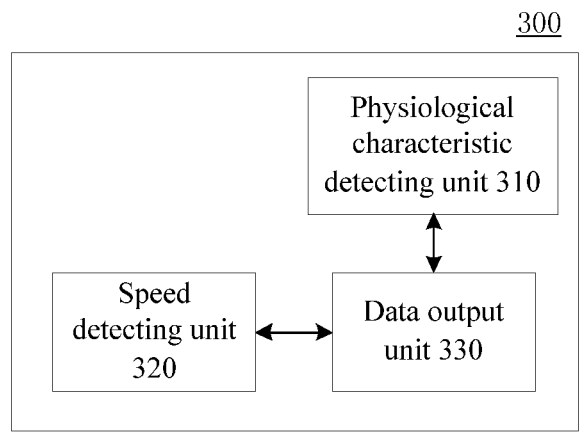
FIG. 9 is yet another illustrative block diagram of a terminal provided in another embodiment of the present disclosure.

For example, FIG. 9 is yet another illustrative block diagram of a terminal 300 provided in another embodiment of the present disclosure. As shown in FIG. 9, the terminal 300 includes a physiological characteristic detecting unit 310, a speed detecting unit 320 and a data output unit 330. For example, the terminal 300 may be specifically embodied as a wearable product such as a hand ring, an intelligent watch etc., and may further include components such as a memory, a communication device, a speaker, a display screen or an input device such as keys or a touch screen.

For example, the physiological characteristic detecting unit 310 may be configured to detect the current physiological characteristic data of the user of the terminal 300. For example, the speed detecting unit 320 may be configured to detect the user's current moving speed. For example, description in embodiments of the information processing apparatus may be referred to for the physiological characteristic detecting unit 310 and the speed detecting unit 320, which will not be described any more herein.

For example, the user's current physiological characteristic data and the user's current moving speed may be used to generate an operation mode adjustment instruction for the second terminal (such as a mobile telephone, a music player, a navigating device etc.). For example, it is possible to generate the operation mode adjustment instruction inside the terminal based on the user's current physiological characteristic data and the user's current moving speed. As another example, it is also possible to generate the operation mode adjustment instruction outside the terminal (e.g., at a server or another terminal) based on the user's current physiological characteristic data and the user's current moving speed.

For example, the data output unit 330 may be configured to output the detected user's current physiological characteristic data and the user's current moving speed. As another example, the data output unit 330 may be further configured to output the data obtained based on the user's current physiological characteristic data and the user's current moving speed.

For example, data obtained based on the user's current physiological characteristic data and the current moving speed may be selected and set according to practical application requirements, which is not limited by embodiments of the present application. For example, data obtained based on the user's current physiological characteristic data and the user's current moving speed, may be a number or a letter corresponding to the user's current physiological characteristic data and the user's current moving speed (for example, 1 for a speed 1-2 km/h, and B for a heart rate of 70 counts/minute). As another example, the data obtained based on the user's current physiological characteristic data and the user's current moving speed may also be one or more of the operation mode adjustment instruction, the current active state, the current possible active state and the first set of current possible active states obtained based on the user's current physiological characteristic data and the user's current moving speed. Description in embodiments of the information processing apparatus may be referred to for contents relating to the current active state, the current possible active state and the first set of current possible active state, which will not be described any more herein.

For example, the data output unit 330 output the detected user's current physiological characteristic data and the user's current moving speed or output the data obtained based on the user's current physiological characteristic data and the user's current moving speed according to a time period. For example, the time period may be set by the user in advance. As another example, the time period may also be set according to the amount of variation with time of the detected user's current physiological characteristic data and/or the user's current moving speed.

For example, the data output unit 330 may output one or more of the user's current physiological characteristic data and the user's current moving speed and the data obtained based on the user's current physiological characteristic data and the user's current moving speed via a communication unit. For example, the communication unit may be as described in the embodiment of the information processing apparatus, and will not be described any more here.

Figure 10:
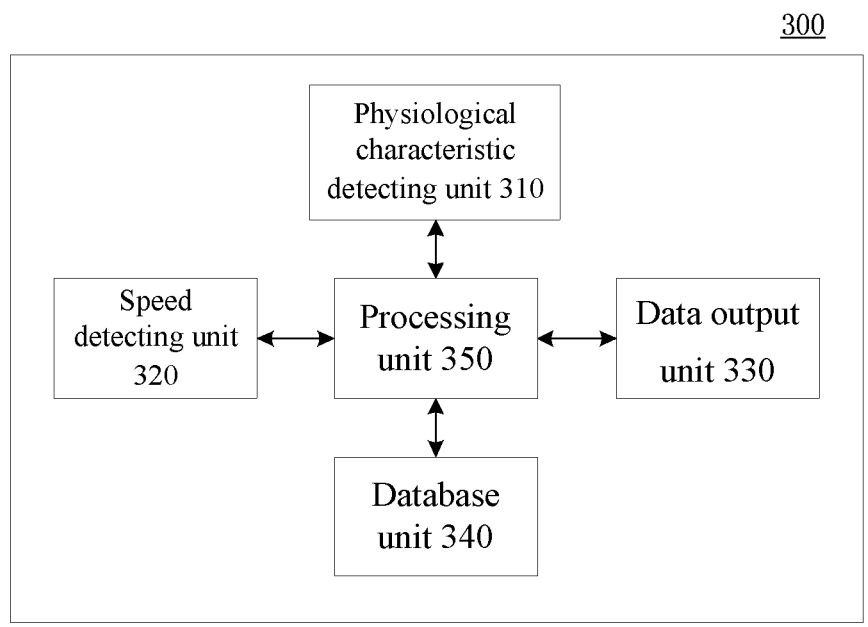
FIG. 10 is yet another illustrative block diagram of a terminal provided in yet another embodiment of the present disclosure.

For example, FIG. 10 is yet another illustrative block diagram of a terminal 300 provided in yet another embodiment of the present disclosure. As compared with the terminal 300 shown in FIG. 9, the terminal 300 shown in FIG. 10 further includes a database unit 340 and a processing unit 350.

For example, the database unit 340 stores different active states and the physiological characteristic data under different active states of the user of terminal 300. For example, the database unit 340 may be as described in the embodiment of the information processing apparatus, and will not be described any more here.

For example, the processing unit 350 may be configured to obtain the user's current moving speed and the user's current physiological characteristic data from the data output unit 330 and inquire the database unit 340 to determine the user's current active state. For example, description in embodiments of the information processing apparatus may be referred to for the method with which the processing unit 350 determines the user's current moving speed, the user's current physiological characteristic data and the database unit 340 determines the user's current active state, which will not be described any more herein. For example, according to the practical application requirements, the processing unit 350 may further use methods other than inquiring database unit 340 to determine the user's current active state, and then the terminal 300 needs not to set the database unit.

For example, the processing unit 350 may further generate an operation mode adjustment instruction based on the user's current active state. For example, description in embodiments shown in FIG. 6 may be referred to for contents relating to that the processing unit 350 generates the operation mode adjustment instruction, which will not be described any more herein.

At least one embodiments of the present disclosure provide a device for adjusting a terminal's operation mode, which includes a speed detecting device, a physiological characteristic detecting device, a controlling device and an operation mode switching device. The speed detecting device is configured to detect the current moving speed of the user of the terminal; the physiological characteristic detecting device is configured to detect the user's current physiological characteristic data; the controlling device is configured to determine the user's current active state according at least to the user's current moving speed and the current physiological characteristic data, thereby generating an operation mode adjustment instruction for the terminal; and the operation mode switching device is configured to adjust the terminal's operation mode according to the operation mode adjustment instruction.

Figure 11:
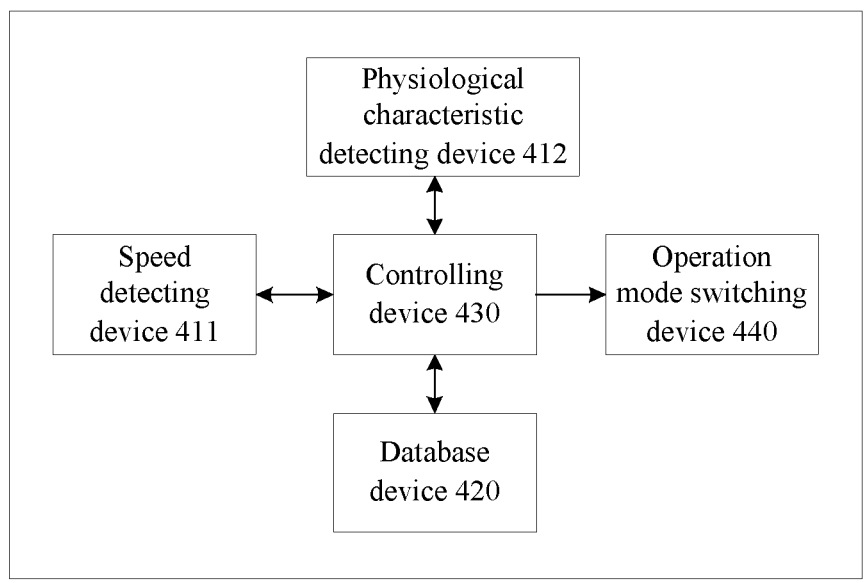
FIG. 11 is an illustrative block diagram of a device for adjusting operating mode of a terminal provided in yet another embodiment of the present disclosure.

For example, FIG. 11 is an illustrative block diagram of a device 400 for adjusting operating mode of a terminal provided in yet another embodiment of the present disclosure. As shown in FIG. 11, the device 400 for adjusting the terminal's operation mode includes a speed detecting device 411, a physiological characteristic detecting device 412, a database device 420, a controlling device 430 and an operation mode switching device 440.

It is to be noted that the device 400's speed detecting device 411, the physiological characteristic detecting device 412, the database device 420, the controlling device 430 and the operation mode switching device 440 may be arranged in the same equipment/device or in different equipments/devices. For example, the speed detecting device 411 and the physiological characteristic detecting device 412 may be arranged in the same terminal such as a hand ring, the database device 420 and the controlling device 430 may be arranged in a server, while the operation mode switching device 440 may be arranged in the terminal to be adjusted such as a cell phone. As another example, the physiological characteristic detecting device 412 may be arranged in one terminal such as a hand ring, while the speed detecting device 411 and the operation mode switching device 440 may be arranged in the terminal to be adjusted such as a cell phone, and the database device 420 and the controlling device 430 may be arranged in a server. As yet another example, the physiological characteristic detecting device 412 may be arranged in one terminal such as a hand ring, while the speed detecting device 411, the database device 420, the controlling device 430 and the operation mode switching device 440 may be arranged in the terminal to be adjusted such as a cell phone.

For example, the speed detecting unit 411 may be configured to detect the current moving speed of the terminal's user. For example, the physiological characteristic detecting device 412 may be configured to detect the current physiological characteristic data of the user of the terminal. For example, the database device 420 stores different active states and the physiological characteristic data under different active states of the user of terminal. For example, description of the speed detecting unit, the physiological characteristic detecting unit and the database unit in embodiments of the information processing apparatus may be referred to respectively for the speed detecting device 411, the physiological characteristic detecting device 412 and the database device 420, which will not be described any more herein.

For example, the controlling device 430 may be configured to inquire the database device 420 according at least to the current moving speed and the current physiological characteristic data of the terminal's user, to determine the current active state of the terminal's user, thereby generating an operation mode adjustment instruction for the terminal.

For example, descriptions of the processing unit in embodiments of the information processing apparatus may be referred to for the method with which the controlling device 430 determines the current active state and thereby generates the operation mode adjustment instruction for the terminal according to the terminal's current moving speed and the current physiological characteristic data, which will not be described any more herein.

For example, in case that the speed detecting device 411, the physiological characteristic detecting device 412 are arranged in two terminals respectively and the current active states determined according to the current physiological characteristic data and the current speed data are inconsistent, it is possible to send the determined two current active states to different terminals respectively and adjust the operation modes of respective terminals.

For example, the operation mode switching device 440 may be configured to adjust the terminal's operation mode according to the operation mode adjustment instruction. For example, description of the operation mode adjusting unit in embodiments of the terminal shown in FIG. 5 may be referred to for the operation mode switching device 440, which will not be described any more herein.

For example, the device 400 for adjusting the terminal's operation mode may further include an environment characteristic data detecting device that may be configured to detect the environment characteristic data at the location where the terminal's user is located. The environment characteristic data may be set according to practical application requirements, which is not limited in embodiments of the present application. For example, the environment characteristic data may include one or combination of sound intensity, intensity of illumination, temperature and humidity.

For example, the controlling device 430 may be further configured to inquire the database device 420 according to the current moving speed, the current physiological characteristic data of the terminal's user and the environment characteristic data at the location where the user is located, to determine the current active state of the terminal's user, thereby generating an operation mode adjustment instruction for the terminal. By introducing the environment characteristic data detecting device, the device 400 for adjusting the terminal's operation mode may determine the user's state more accurately, thereby switch the terminal's operation mode more intelligently, which in turn can further improve the user's use experience.

Figure 12:
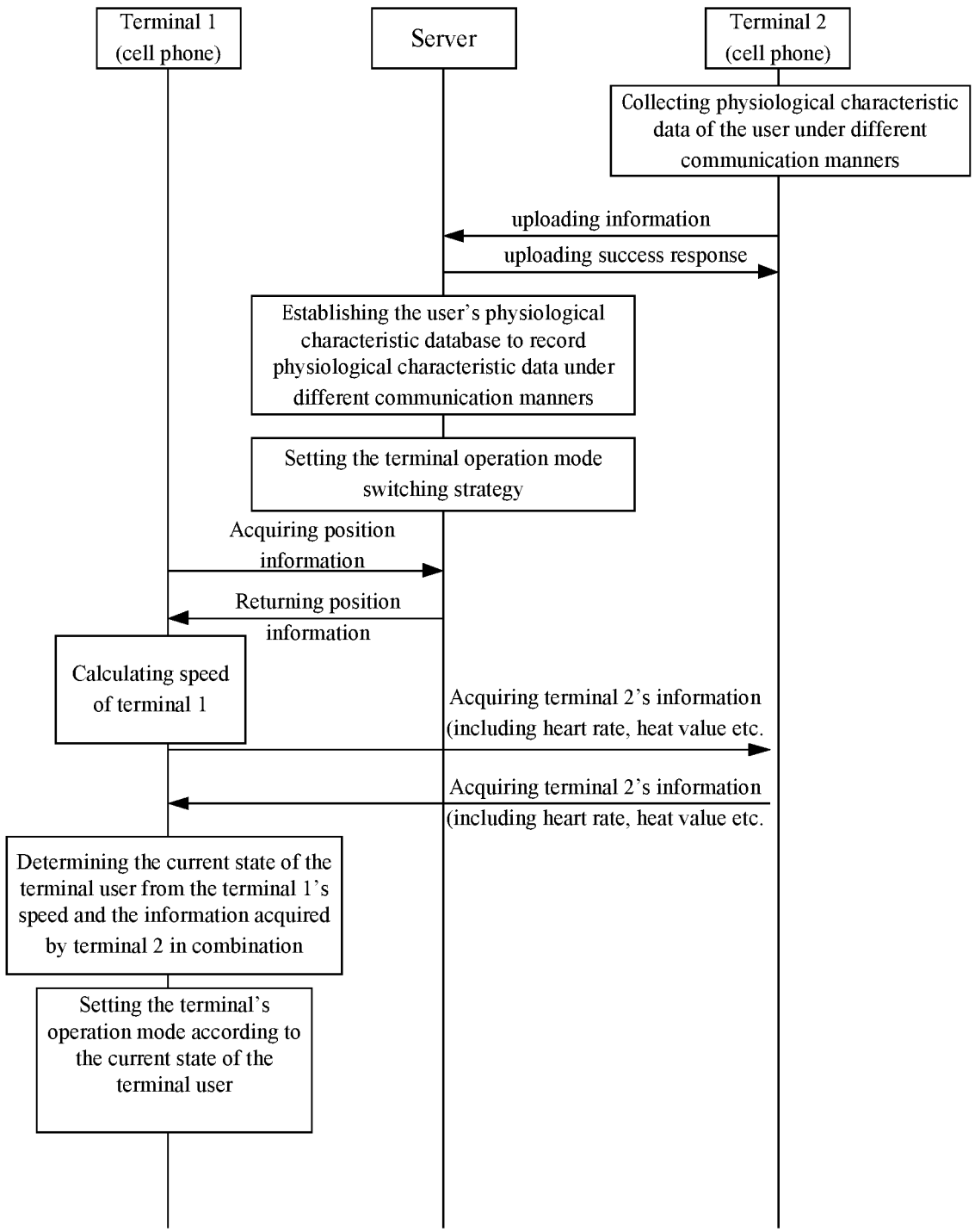
FIG. 12 is an illustrative operation flow chart of a device for adjusting operating mode of a terminal provided in yet another embodiment of the present disclosure.

For example, FIG. 12 is an illustrative operation flow chart of a device for adjusting operating mode of a terminal provided in yet another embodiment of the present disclosure. As shown in FIG. 12, the device for adjusting the terminal's operation mode includes a terminal 1 such as a cell phone terminal, a terminal 2 such as a hand ring terminal and a server. The server accesses the Internet in a wired or wireless manner and may be in various forms such as a traditional server or a cloud server. The work flow for the device for adjusting the terminal's operation mode in the present embodiment includes the following steps:

S110: Establishing, by the server, a physiological characteristic database for the user (namely, the user of terminal 1);

S120: Setting, by the user, the operation mode switching strategy of the terminal 1;

S130: Acquiring, by the terminal 1, the user's current moving speed, and determining the user's current possible active state;

S140: Acquiring, by the terminal 1, the user's current physiological characteristic data;

S150: Determining, by the terminal 1, the user's current state, namely the user's current active state by considering the user's current moving speed information, the current physiological characteristic data and the physiological characteristic data under various historic active states in combination;

S160: Setting, by the terminal 1, the operation mode for the terminal 1 according to the user's current state.

For example, in step S110, the physiological characteristic database for the terminal's user may be established by the following approach.

(1) First of all, the terminal 2 collects the user's physiological characteristic data under various states, including physiological characteristic data under active states such as walking (slowly, moderate speed, quickly), cycling (slowly, moderate speed, quickly), driving (slowly, moderate speed, quickly), train or airplane;

(2) Then, the terminal 2 sends the physiological characteristic data to the server;

(3) Finally, the terminal 2 receives an uploading success response returned by the server. The uploading success response returned by the server received by the terminal 2 indicates that the physiological characteristic database of the terminal's user has been established successfully.

For example, the physiological characteristic database records physiological characteristic data of each user under different active states of which the type may be set according to the practical application requirements. For example, the physiological characteristic data may include one of or a combination of pulse, temperature, heart rate, breath, EEG, ECG, blood pressure, blood oxygen, EMG, skin impedance, skin heat value.

For example, in step S120, the terminal's user may select the operation mode switching strategy of the terminal 1. For example, in case that the physiological characteristic database stores the heart rate and the skin heat value data, the user may select one operation mode switching scheme from those shown in Table 1 as the operation mode switching strategy for terminal 1.

For example, in step S130, the terminal 1 may acquire the user's current moving speed, and determine the user's current possible active state according to the following ways.

(1) First of all, the terminal 1 acquires position information from the server;

(2) Then, the terminal 1 receives the position information returned by the server;

(3) Next, the terminal 1 calculates the user's current moving speed;

(4) The terminal 1 determines the user's current possible active state according to the user's current moving speed. For example, the terminal 1 may determine the user's current possible active state according to various active states and corresponding moving speeds shown in Table 2.

Obviously, various active states and corresponding moving speeds shown in Table 2 are only illustrative and data in Table 2 may be adjusted properly according to the user's own conditions.

TABLE 1

| Scheme | Factor | | |
|---|---|---|---|
| | speed | Heart rate | Skin heat value |
| Scheme 1 | ✓ | | |
| Scheme 2 | ✓ | ✓ | |
| Scheme 3 | ✓ | | ✓ |
| Scheme 4 | ✓ | ✓ | ✓ |

TABLE 2

| Serial No. | Active State | Speed (km/hr) |
|---|---|---|
| 1 | Walking | 1-10 |
| 2 | running | 5-20 |
| 3 | Cycling | 10-50 |
| 4 | driving | 20-120 |
| 5 | Train | 50-200 |
| 6 | High speed train | 50-300 |
| 7 | Airplane | 700-1000 |

For example, in step S140, the terminal 1 may acquire the user's current physiological characteristic data information according to the following manner.

(1) First of all, the terminal 1 sends the acquired user's physiological characteristic data information to the terminal 2;

(2) Then, the terminal 2 extracts the user's physiological characteristic data information requested by the terminal 1;

(3) Next, the terminal 2 sends the user's physiological characteristic data information to the terminal 1;

(4) Finally, the terminal 1 receives the user's current physiological characteristic data information sent by the terminal 1.

Figure 13:
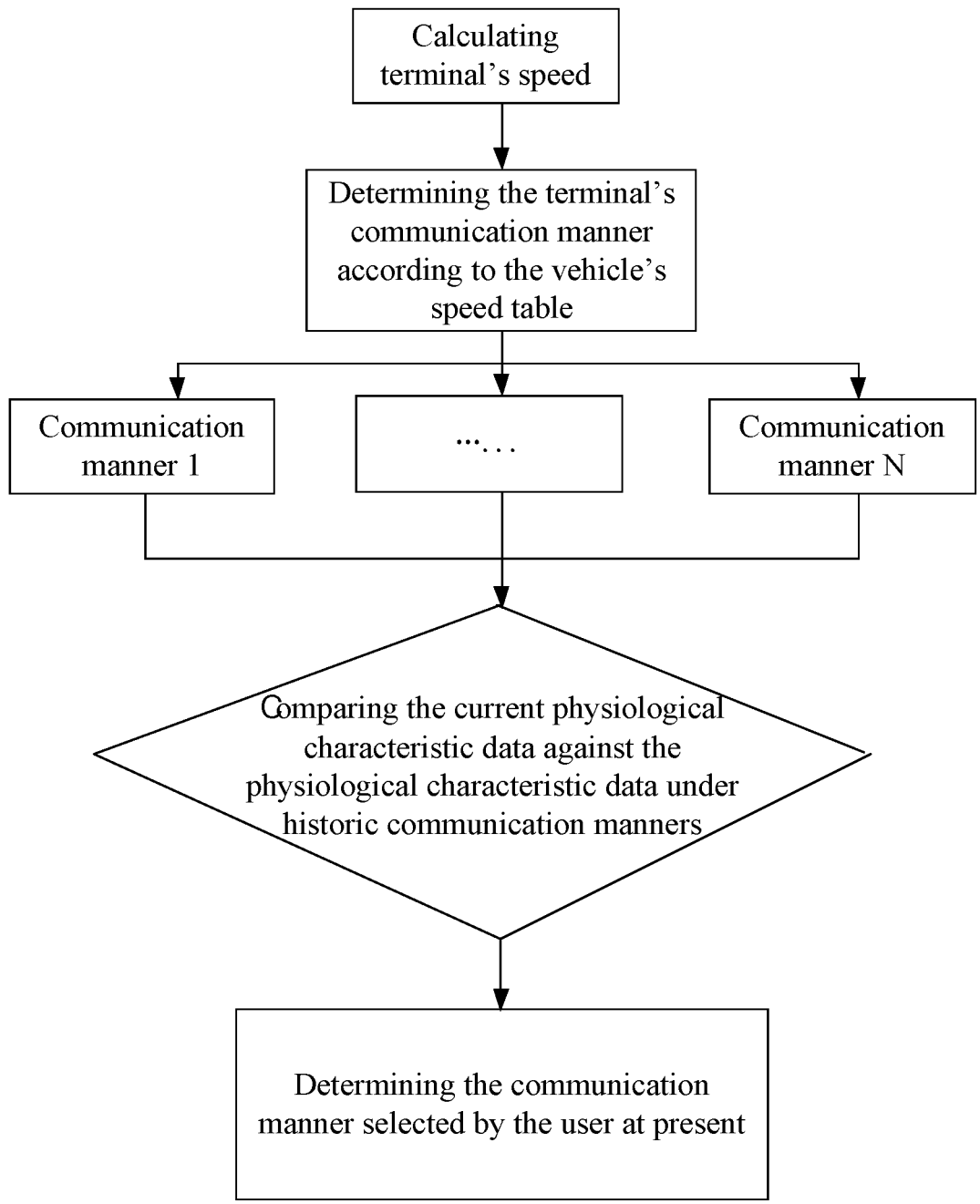
FIG. 13 is a flow chart of a method for determining the current state of the terminal's user by the device for adjusting the terminal's operation mode provided in yet another embodiment of the present disclosure.

For example, in step S150, the terminal 1 may determine the user's current active state according to the approach shown in FIG. 13. As shown in FIG. 13, first of all, the terminal 1 determines a set of possible active states according to the calculated terminal's speed (namely the current moving speed) and the vehicle's speed meter (namely Table 2). Then, the terminal 1 determines the user's current active state, namely the most likely active state by considering the user's current moving speed information, the current physiological characteristic data and the physiological characteristic data under various historic active states. For example, the terminal 1 may acquire the physiological characteristic data of the user under various historic active states from the server. For example, in case that the user selects an unsuitable operation mode switching strategy, there may be more than one current active states of the user that the terminal 1 determines. However the number of the user's current active states obtained now should be less than the number of active states determined according to the current moving speed.

Figure 14:
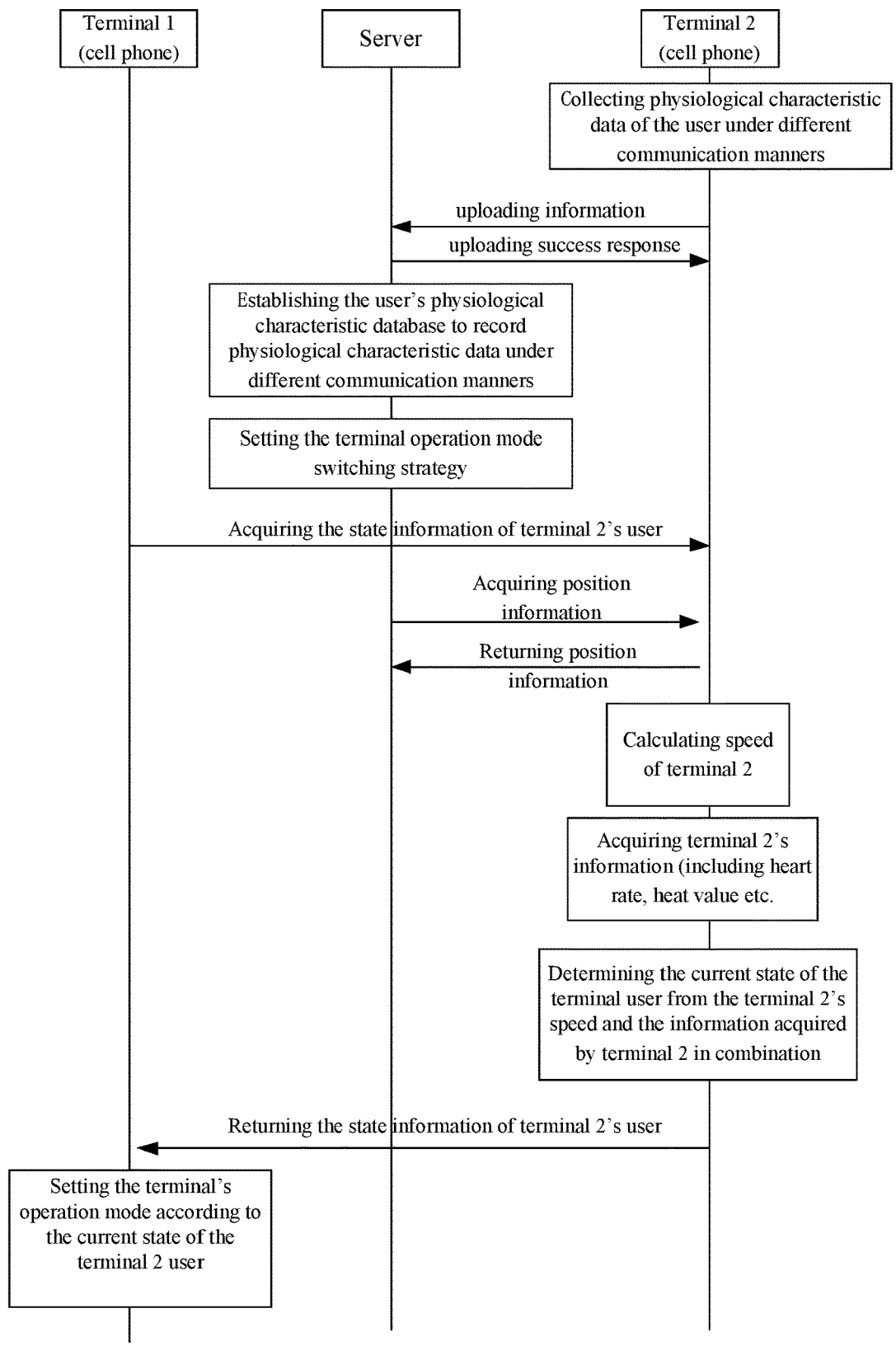
FIG. 14 is another illustrative operation flow chart of a device for adjusting operating mode of a terminal provided in yet another embodiment of the present disclosure.

For example, FIG. 14 is another illustrative operation flow chart of a device for adjusting operating mode of a terminal provided in yet another embodiment of the present disclosure. As shown in FIG. 14, the device for adjusting the terminal's operation mode includes a terminal 1 such as a cell phone terminal, a terminal 2 such as a hand ring terminal and a server. Again, the server accesses the Internet in a wired or wireless manner and may be in various forms such as a traditional server or a cloud server. The work flow for the device for adjusting the terminal's operation mode includes the following steps:

s210: Establishing, by the server, the physiological characteristic database of the terminal's user;

s220: Setting, by the terminal's user, the operation mode switching strategy of the terminal 1;

s230: Requesting, by the terminal 1, to acquire the status information (namely the current active state) of the terminal's 2 user (namely the user of the terminal) from the terminal 2;

s240: Acquiring, by the terminal 2, the user's current moving speed, and determining the user's current possible active state;

s250: Acquiring, by the terminal 2, the user's current physiological characteristic data;

s260: Determining, by the terminal 2, the state information on the user of terminal 2, namely the current active state by considering the user's current moving speed information, the current physiological characteristic data and the physiological characteristic data under various historic active states;

s270: Sending, by the terminal 2, the state information of the user of terminal 2 to the terminal 1;

s280: Receiving, by the terminal 1, the state information of the user of terminal 2 sent by the terminal 2 and setting the operation mode for terminal 1 according to the state information of the user of terminal 2.

For example, step S110 and step S120 may be referred to respectively for the manner in which the user's physiological characteristic database is established in step S210 and the manner in which the operation mode switching strategy is set for terminal 1 in step S220, which will not be described any more herein.

For example, description of the method in step S130 with which the terminal 1 acquires the user's current moving speed and determines the user's current possible active states may be referred to for the method in step S240 in which the terminal 2 acquires the user's current moving speed and determines the user's current possible active state, which will not be described any more herein.

For example, description about the terminal 1 determining the current state of the terminal's user in FIG. 13 and step S150 may be referred to for the method in step S260 for determining the state information of the user of terminal 2, which will not be described any more herein.

At least one embodiment of the present disclosure provides a method for adjusting operation mode of a terminal, including: Detecting a current moving speed of the terminal's user; detecting the user's current physiological characteristic data; determining the user's current active state based at least on the user's current moving speed and the current physiological characteristic data, thereby generating an operation mode adjustment instruction for the terminal; and Adjusting the operation mode of the terminal according to the operation mode adjustment instruction.

Figure 15:
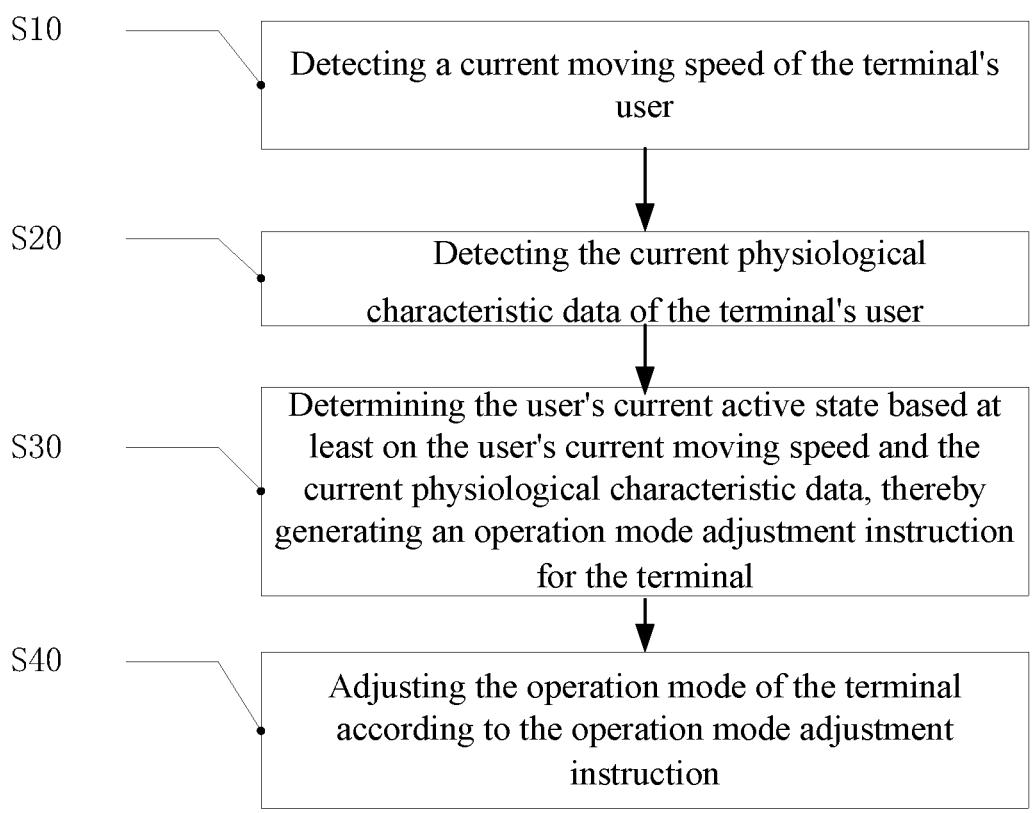
FIG. 15 is a flow chart of a method for adjusting operating mode of a terminal provided in yet another embodiment of the present disclosure.

For example, FIG. 15 is a flow chart of a method for adjusting operating mode of a terminal provided in yet another embodiment of the present disclosure. As shown in FIG. 15, the method for adjusting operation mode of the terminal may include the following steps:

s10: Detecting a current moving speed of the terminal's user;

s20: Detecting the current physiological characteristic data of the terminal's user;

s30: Determining the user's current active state based at least on the user's current moving speed and the current physiological characteristic data, thereby generating an operation mode adjustment instruction for the terminal; and S40: Adjusting the operation mode of the terminal according to the operation mode adjustment instruction.

For example, in step S30, it is possible to inquire the database device according to the current moving speed and the current physiological characteristic data of the terminal's user to thereby generate an operation mode adjustment instruction for the terminal, and the database stores different active states and physiological characteristic data of the terminal's user under different active states.

For example, embodiments of the information processing apparatus and device may be referred to for the method involved in S10-S40, which will not be described any more herein.

For example, yet another embodiment of the present disclosure provides an information processing method including: Receiving the user's current physiological characteristic data; and Determining the user's current active state at least based on the received current physiological characteristic data, said user's current active state being used to generate an operation mode adjustment instruction for the terminal.

For example, yet another embodiment of the present disclosure provides a method for adjusting operation mode of a terminal, including: Receiving an operation mode adjustment instruction at least based on the current physiological characteristic data of the terminal's user, and Setting the operation mode of the terminal according to the operation mode adjustment instruction.

For example, yet another embodiment of the present disclosure provides a method for adjusting operation mode of a terminal, including: Detecting the current physiological characteristic data of the terminal's user; Detecting the user's current moving speed; outputting the detected user's current physiological characteristic data and the user's current moving speed or outputting the data obtained based on the user's current physiological characteristic data and the user's current moving speed, the user's current physiological characteristic data and the user's current moving speed being used to generate an operation mode adjustment instruction for the second terminal.

Embodiments of the present disclosure provide an information processing apparatus, an information processing method, a terminal and a device and method for adjusting operation mode of a terminal that realize more intelligent switching of the terminal's operation modes and thereby improve the use experience of the user.

Those skilled in the art may clearly understand that embodiments of the present disclosure may be implemented by means of software plus necessary general purpose hardware, or of course by means of dedicated hardware. However, the former may be a preferred implementation in many cases. Based on such understanding, technical proposals of embodiments of the present disclosure are embodied in nature in software, hardware or any combination thereof. The computer software product is stored in a readable storage medium such as a magnetic storage medium (e.g., hard disk) or an electronic storage medium (e.g., ROM, flash memory) etc., and includes several instructions for causing a computing device (that may be a computer, a server or a network equipment etc.) to carry out methods described in various embodiments of the present disclosure.

Although the present disclosure has been described in detail above with the general explanation and specific implementations, it may be subject to some modifications or improvements based on the embodiments of the present disclosure, which will be obvious for those skilled in the art. Therefore, all these modifications or improvements made without departing from the spirit of the present disclosure fall within the scope claimed by the present disclosure.

The present application claims priority of China Patent application No. 201710001286.9 filed on Jan. 3, 2017, the content of which is incorporated in its entirety as part of the present application by reference herein.

The invention claimed is:

1. An information processing apparatus, comprising: a data receiver, a database memory and a processor,
   the data receiver being configured to receive current physiological characteristic data of the user and provide it to the processor;
   the database memory storing computer program instructions causing the processor to execute the following steps in response to processing the computer program instructions:
   determining the user's active state at least based on the current physiological characteristic data received by the data receiver and using the active state as the user's current active state; wherein the current active state is used to generate an operation mode adjustment instruction for the terminal;
   wherein the processor further executes following steps in response to processing the computer program instructions:
   sending the current active state to the terminal to allow the terminal to generate the operation mode adjustment instruction according to the current active state, or generate the operation mode adjustment instruction corresponding to the current active state and sending it to the terminal: wherein the operation mode adjustment instruction is used to instruct the terminal to adjust a current operation mode,
   wherein the current active state of the user refers to a current movement of the user.

2. The information processing apparatus of claim 1, further comprising a speed acquirer,
   wherein the speed acquirer is configured to acquire a current moving speed of the user;
   the processor further executes following steps in response to processing the computer program instructions:
   determining the user's the active state based on the current physiological characteristic data and the current moving speed, and using the active state as the user's current active state.

3. The information processing apparatus of claim 2, wherein the determining the user's the active state based on the current physiological characteristic data and the current moving speed in combination, and using the active state as the user's the current active state comprises:
   determining the user's current possible active state based on the current physiological characteristic data, then determining the user's active state based on the current possible active state and the current moving speed, and using the active state as the current active state.

4. The information processing apparatus of claim 2, further comprising a physiological characteristic detector and a speed detector,
   wherein the physiologic& characteristic detector is configured to detect and output the current physiological characteristic data, and the data receiver is configured to receive the current physiological characteristic data from the physiological characteristic detector;

wherein, the speed detector is configured to detect and output the current moving speed, and the speed acquirer is configured to acquire the current moving speed from the speed detector.

5. The information processing apparatus of claim 1, further comprising a speed acquirer,
wherein the speed acquirer is configured to acquire a current moving speed of the user;
the processor further executes following steps in response to processing the computer program instructions:
determining the user's the active state based on the current physiological characteristic data and the current moving speed, and using the active state as the user's current active state;
the processor further executes following steps in response to processing the computer program instructions: determining the user's first set of current possible active states based on the current moving speed, then determining the user's the active state based on the first set of current possible active states and the current physiological characteristic data, and using the active state as the current active state.

6. A terminal, comprising:
a processor configured to generate an operation mode adjustment instruction based on an user's current active state which is determined at least based on a current physiological characteristic data of the terminal's user;
an operation mode adjustor configured to receive the operation mode adjustment instruction, and set the terminal's operation mode according to the operation mode adjustment instruction,
wherein the current active state of the user refers to a current movement of the user.

7. The terminal of claim 6, further comprising a speed detector,
wherein the speed detector is configured to detect and output the user's current moving speed.

8. The terminal of claim 6, further comprising:
a signal receiving device configured to receive the user's current active state determined based on the current moving speed data and the current physiological characteristic data of the terminal's user;
wherein, the processor is further configured to send the operation mode adjustment instruction to the operation mode adjustor.

9. The terminal of claim 6, further comprising:
a signal receiving device configured to at least receive the current physiological characteristic data;
a processor configured to determine the user's current active state based on the user's current moving speed and the current physiological characteristic data, and generate the operation mode adjustment instruction based on the current active state and send the operation mode adjustment instruction to the operation mode adjustor.

10. A terminal of claim 6, further comprising:
a first detector, detecting a current moving speed of the terminal's user;
a second detector, detecting the user's current physiological characteristic data;
a control unit, determining the user's current active state at least according to the user's current moving speed and the current physiological characteristic data, thereby generating the operation mode adjustment instruction for the terminal.

11. A terminal, comprising:
a physiological characteristic detector configured to detect the current physiological characteristic data of the user of the terminal;
a speed detector configured to detect the user's current moving speed; and
a processor configured to determine the user's current active state at least according to the user's current moving speed and the current physiological characteristic data, thereby generating an operation mode adjustment instruction for the terminal,
wherein the current active state of the user refers to a current movement of the user.

12. The terminal of claim 11, further comprising:
a data output unit configured to output detected the user's current physiological characteristic data and the user's current moving speed, or configured to output data obtained based on the user's current physiological characteristic data and the user's current moving speed, wherein the user's current physiological characteristic data and the user's current moving speed are used to generate an. operation mode adjustment instruction for a second terminal.

13. The terminal of claim 12, wherein the processing unit is configured to acquire the current moving speed and the current physiological characteristic data from the data output unit.

* * * * *